June 3, 1958 J. DOWSE ET AL 2,837,592
SEPARATORS FOR ELECTRIC STORAGE BATTERIES
Filed Aug. 26, 1954 2 Sheets-Sheet 1
FIG. I.
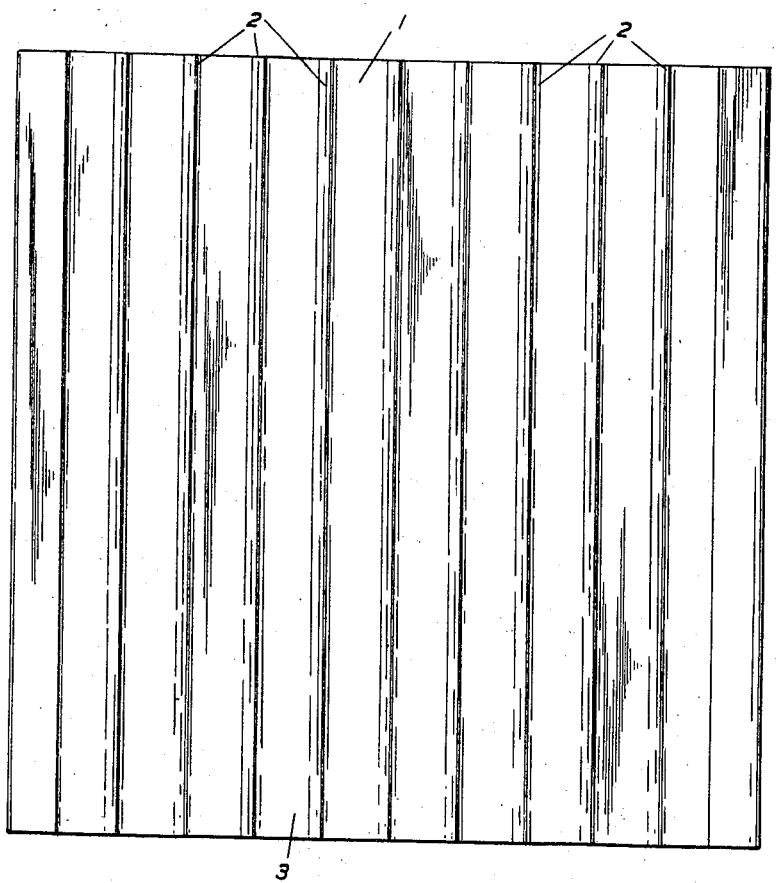
FIG. 2.
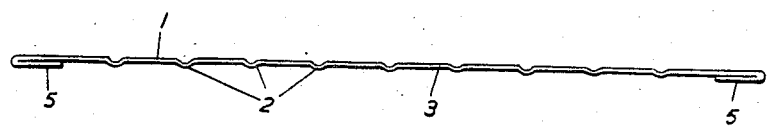
*Inventor*
*Joseph Dowse*
*Frank Booth*
By
*Attorney*

June 3, 1958      J. DOWSE ET AL      2,837,592
SEPARATORS FOR ELECTRIC STORAGE BATTERIES
Filed Aug. 26, 1954      2 Sheets-Sheet 2
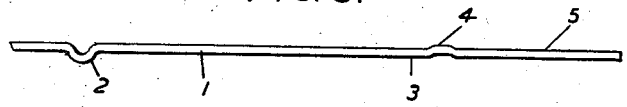
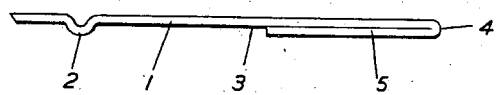
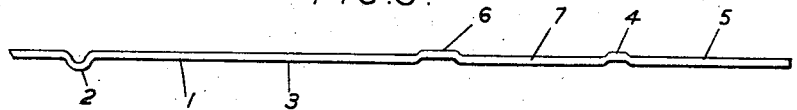
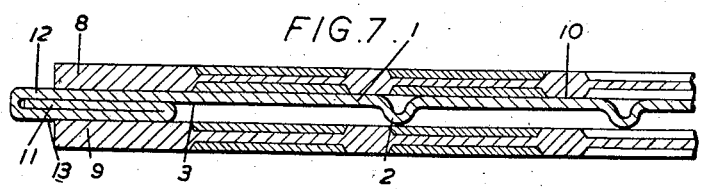
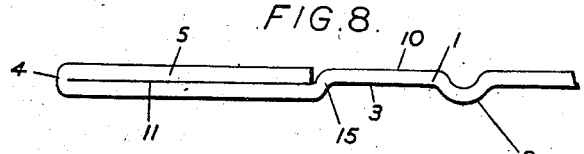
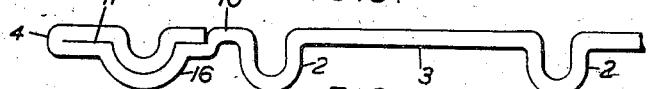
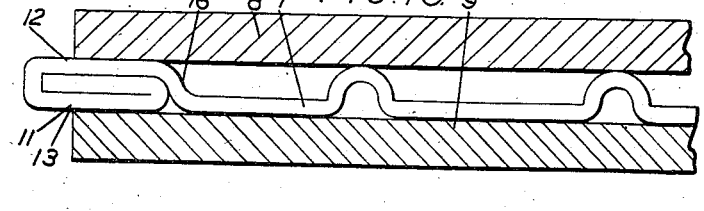
Inventor
Joseph Dowse
Frank Booth
By
Attorney

United States Patent Office 2,837,592
Patented June 3, 1958

2,837,592
SEPARATORS FOR ELECTRIC STORAGE BATTERIES

Joseph Dowse and Frank Booth, Denton, England, assignors to The British Fibrak Separator Company Limited, Denton, Lancashire, England, a British company Application August 26, 1954, Serial No. 452,390

4 Claims. (Cl. 136—145)

This invention relates to separators for electric storage batteries and has for its main object to provide suitable separator strength in the vertical marginal areas so as to reduce the hazard of shorting between the edges of complementary plates between which the separators may be disposed, and to enable them to be firmly packed between complementary plates and to provide intimate contact with the co-acting faces of the plates so as to prevent relative movement which could initiate buckling in the vertical edges of the separators. Accordingly, the invention comprises a ribbed separator for an electric storage battery characterised by a series of parallel ribs protruding from one face and running from top to bottom of the separator, the side margins of the separator each being provided with a bonded folded portion, which is formed so that the greatest thickness thereof is bounded by the planes bounding the greatest thickness of the remainder of the ribbed separator, i. e., the planes in which lie respectively the outer surfaces of the ribs at the greatest height thereof, and the surfaces of the non-ribbed portions of the separator on the other face thereof.

The height of the ribs may be an exact multiple of the thickness of the separator material, in which case the number of folds at each side margin is equal to said multiple and the bonded folded portions are flat.

Alternatively, the folded portions may be ribbed.

The separator may be formed in known manner of synthetic material, such as wood pulp with or without the admixture of fibres of glass or asbestos, or may be made up from any other fibrous material which is inert to sulphuric acid, or alternatively of porous rubber or polyvinyl chloride, that is to say rubber or plastic material which is porous and inert to sulphuric acid in an electric storage battery. The separators may be made individually by pressing from suitable material or formed in continuous lengths, for example, in a web form, by rollers, as will be well understood in the art.

The ribs may be formed in a web of separator material transversely of its length, the width of the web being substantially equal to the height of the separator, in accordance with the disclosures contained in Merrill United States Patent No. 2,687,445, in which case the folded edges will be provided subsequently to the formation of the individual separators.

Alternatively, the ribbed material may be produced as disclosed in copending patent application Serial No. 377,207, filed August 28, 1953, now Patent No. 2,811,745, by Joseph Dowse and Harry Holt, Jr., from substantially dry (4% to 10% moisture content) sheet material made from paper pulp and impregnated with resin in quantity insufficient to impair the desired electrolyte permeability characteristic of the material, by progressively deforming the sheet material about parallel fins from the middle outwardly towards each edge of the sheet parallel to the deformation, maintaining the deformations and applying sufficient heat and pressure locally to the deformations to cure the resin in the deformed areas, whereby a set of stable fine ribs are formed in the material, coating the crests of the ribs with strong solution of resin (about 70% solution) and curing all the uncured resin in and on the sheet whereby the ribs are given sufficient mechanical strength for a separator, while extensive electrolyte permeable area is obtained.

As a further alternative the ribbed material may be made in accordance with the specification of said patent application Serial No. 377,207, from substantially dry (4% to 10% moisture content) sheet material in ribbon form made from paper pulp and impregnated with resin in quantity insufficient to impair the desired electrolyte permeability characteristic of the meaterial, by progressively deforming the ribbon material about parallel ribs from the middle outwardly towards each edge of the ribbon, maintaining the deformation and applying sufficient heat and pressure locally to the deformation to cure the resin in the deformed areas, whereby a set of parallel ribs are formed lengthwise of the ribbon, coating the crests of the ribs with a strong solution of resin (about 70% solution) and curing all the uncured resin in and ont the sheet (whereby the ribs are given sufficient mechanical strength for a separator, while extensive electrolyte permeable area is obtained).

The ribbed separator material in web form is subsequently cut to desired size, and either before or after cutting is treated with a suitable wetting agent.

The curing operation on the deformed separator material is advantageously effected by using radiant heat.

In employing either of the two last-mentioned processes, the ribs are provided lengthwise of the ribbon and the folded edges may be formed continuously as the web passes through the various web-treating machines. The width of the web utilised is greater than that of the intended separator so as to provide at each side a portion or portions to be folded over.

Accordingly, the invention includes a method of making a ribbed separator from web material, including the steps of setting up a series of parallel ribs from one face of the material and producing parallel depressions in the said face so as to be disposed on each side of the series of ribs, the ribs being formed with a height which is a multiple of the thickness of the material and the number of depressions to each side of the series of ribs being equal to the said multiple, applying a bonding medium over the material to be folded, folding over flat the material at each depression on to the face from which the ribs protrude, and applying pressure to the folded material, whereby bonded flat folds in the margins of the separator material are produced equal in thickness to the height of the ribs, the faces of the marginal folds being flat.

Where more than one depression is produced on each side of the separator material, the succeeding depressions correspondingly increase in width from the edge by increments equal to the thickness of the material.

In employing this method of manufacture, the margins of the web material with the depressions may encounter deflecting shoes which progressively turn over the marginal edges. The shoes may also be used to press the folded material together to form bonded flat folds, but preferably independent roller means, which may be heated, are used.

The step of producing the parallel depressions may occur before the setting up of the series of parallel ribs, in which case depression forming rollers are disposed between the web impregnator and drier and the rib forming rollers, the margins of the web subsequently encountering deflecting shoes to turn over the marginal edges and fold them flat. The final bonding of the folded margins may take place on the rib forming drum, by means of counter pressure rollers, which may be heated, simultaneously with the setting up of the ribs.

Alternatively, the step of producing the parallel depressions may occur after the setting up of the series of parallel ribs and the formation of the folded margins and their bonding immediately before the final curing of the resin in the separator material.

As a further alternative, the margins of the web material produced may encounter deflecting shoes which progressively turn over the marginal edges to form the flat folds and finally press them together, such shoes being disposed between a bath in which the formed ribs are coated with resin and a final curing oven so that the web with the coated ribs and the folded margins passes into the oven and thence through a wetting out bath and a trimmer to a guillotine.

Accordingly the present invention also comprises a method of making a ribbed separator for an electric storage battery from a web of separator material, consisting of utilising a web of greater width than that of the intended separator size, setting up a series of parallel ribs from one face of the material, and simultaneously producing parallel depressions in the said face so as to be disposed to each side of the series of ribs, the ribs being formed with a height which is a multiple of the thickness of the material, and the number of depressions to each side of the series of ribs being equal to the said multiple, applying a bonding medium over the material to be folded, folding over flat the material at each depression on to the face from which the ribs emanate and applying presure to the folded material whereby bonded flat folds at the margins of the separator material are produced equal in thickness to the height of the ribs, the faces of the marginal folds being flat.

Further the invention comprises a method of making a ribbed separator for an electric storage battery from a web of separator material of greater width than that of the intended separator size, including the steps of producing parallel depressions near the side margins of said web, applying a bonding medium over the material to be folded, folding over flat the material at each depression, and applying pressure to the folded material to form folded portions protruding beyond one face only of the web, and subsequently setting up a series of parallel ribs from said face, including ribs in said folded portions, whereby the thickness of the folded portions is bounded by the planes bounding the thickness of the remainder of the ribbed web.

The thickness of a separator to a certain extent determines the electric resistance of a cell and normally thinner separators would be used in batteries subject to heavy surges, such as in starting up a motor vehicle, while thicker separators are used in electric traction or other batteries where there is a comparatively low discharge and a low internal resistance is not essential.

The present invention is applicable to separators of all types and for all purposes and achieves sufficient strength in the vertical edges of the separator to reduce the hazard of shorts between the complementary plates and, because of the marginal strength imparted, that buckling which is usually engendered in the marginal edges is substantially prevented.

In order that the invention may be more clearly understood, some preferred embodiments will now be described by way of example with reference to the accompanying diagrammatic drawings in which:

Figs. 1 and 2 are an elevation and end plan respectively of a ribbed separator with a single flat fold at each side margin, the thickness of which is equal to the height of the ribs formed in the separator, Fig. 3 is a fragmentary view similar to Fig. 2, indicating the marginal formation before the flat fold is formed, Fig. 4 is a view similar to Fig. 3 showing the single flat fold produced in the separator, Fig. 5 is a view similar to Fig. 3 showing the marginal formation of the separator material before the flat fold is produced, two depressions parallel to the ribs being provided in the marginal area so that a double fold can be obtained equal to the height of the ribs, Fig. 6 is a view similar to Fig. 4 showing the production of a double fold in the side margin of the separator shown in Fig. 5, Fig. 7 shows in sectional plan the disposal of a separator made from material such as is illustrated in Fig. 4 and disposed between the complementary plates of an electric storage battery, Fig. 8 is an end plan of the marginal portion of a separator having a single flat fold, the folded-over portion lying on the face of the separator opposite to that from which the ribs protrude, and Fig. 9 is an end plan of the marginal portion of a separator having a ribbed folded portion; and Fig. 10 is an end plan of a separator disposed between the complementary plates of an electric storage battery, the separator having a double flat fold, and the folded-over portion lying on the face of the separator opposite that from which the ribs protrude.

In the drawings like references designate similar parts.

Referring first to Figs. 1 to 4 the separator 1 is shown with a series of nine parallel ribs 2, which, as shown in Fig. 2, are set up from one face 3 of the separator. The crest of each rib 2 is raised above the surface 3 for a height equal to the thickness of the separator material. In the margin of the face 3, depressions 4 are formed (see Fig. 3), one on each side of the series of ribs 2, each of which depressions forms a fold line for the material 5 outside the depression 4 about which fold line the material 5 is turned over flat on to the face 3.

When the material 5 outside the depression 4 is turned over on to the face 3, the thickness of the fold is equal to the height of the ribs, and the width of the overlap is sufficient to adequately cover the complementary vertical margins of the contiguous plates.

Instead of merely providing two single folds, in suitable cases, two double folds may be provided, and in that case higher ribs are formed. Such an arrangement is illustrated in Figs. 5 and 6.

In this case, a series of ribs 2 are set up from one face 3 of the separator. The crest of each rib 2 is raised above the surface 3 for a height equal to twice the thickness of the separator material. The face 3 has two depessions 4, 6 on each side of the series of ribs 2. The inner depressions 6 are wider than the outer depressions 4 to accommodate the first fold made, and the depressions form successive fold lines for the material outside the depressions.

The material 5 outside the depression 4 is first turned over on to the material 7 between the depressions 4—6 and folded down flat, then this single fold is folded in the depression 6 until it is folded flat on to the face 3. The thickness of the double fold is thus equal to the height of the ribs 2.

The separator 1, as shown in Fig. 7, is disposed between two complementary electrode plates 8 and 9, the flat back face 10 of the separator lying against the negative plate 8 and the crests of the ribs engaging the positive plate 9. The folded marginal portion 11 of the separator has two flat faces 12, 13, which provide intimate contact with the co-acting marginal faces of the electrode plates. As the ribs and marginal folds are of equal height, relative movement between the separator and plates is prevented at the edges where buckling of the separator usually commences.

As will be understood, if the rib height is increased to another multiple of the separator material thickness, as is feasible with the thinner separators, it is only necessary to increase the number of depressions to each side to be equal to the said multiple, so that the folds have the same height as the ribs.

The depressions 4 may, as shown in Fig. 8, be formed in the other face 10 of the separator 1. In this case the material 5 is turned over flat on to the face 10 and the folded marginal portion 11 is displaced at 15 so as to be bounded by the planes bounding the remainder of the ribbed separator.

The marginal folded portion 11 may, if necessary or desired, be ribbed as shown in Fig. 9. In this case the rib 16 is set up in both thicknesses of the folded portion 11 at the same time as the ribs 2, and is of such height that the planes bounding the ribbed separator also bound the marginal portions.

Fig. 10 shows, disposed between two complementary electrode plates 8 and 9, a separator 1 having a double folded marginal portion 11 which, as in the separator shown in Fig. 7 has two flat faces 12 and 13 in contact with the co-acting marginal faces of the plates 8 and 9 respectively. In this form however, the material at the margin is folded over twice on the face of the separator opposite that from which the ribs 2 protrude and the doubly folded marginal portion is displaced at 16 so as to be bounded by the planes bounding the remainder of the ribbed separator.

We claim:

1. A plate separator for electric storage batteries comprising a web of fibrous separator material, integral portions upthrust from said web forming parallel hollow ribs extending across said separator and raised to a uniform height above the face thereof and being dimensionally stable under conditions of use, said height being an exact multiple of the thickness of the separator material, and an integrally, bonded, folded portion of the web in each of the side margins of said separator parallel to said ribs, the number of folds of said separator material at each side margin being equal to said exact mutiple of the thickness of the separator material.

2. A separator according to claim 1 wherein the integrally, bonded, folded portions of the web in the side margins of the separator are flat.

3. A separator according to claim 1 wherein the integrally, bonded, folded portions of the web in the side margins of the separator are ribbed.

4. A separator according to claim 1 in which the web of separator material comprises sheet material made from paper pulp and impregnated with a thermosetting resin in quantity insufficient to impair the desired electrolyte permeability characteristic of the material.

References Cited in the file of this patent

UNITED STATES PATENTS

| | | |
|---|---|---|
| 1,846,090 | De Loye et al. | Feb. 23, 1932 |
| 2,120,120 | Wells | June 7, 1938 |
| 2,465,493 | Strickhouser et al. | Mar. 29, 1949 |
| 2,687,445 | Merrill | Aug. 24, 1954 |